United States Patent [19]

Kübel et al.

[11] Patent Number: 4,836,350
[45] Date of Patent: Jun. 6, 1989

[54] DISC-SHAPED BODY FOR USE IN CLUTCH PLATES

[75] Inventors: Manfred Kübel, Bühl/Baden; Gerhard Maisch, Achern, both of Fed. Rep. of Germany

[73] Assignee: Luk Lamellen und Kupplungsbau GmbH, Bühl, Fed. Rep. of Germany

[21] Appl. No.: 940,673

[22] Filed: Dec. 11, 1986

[30] Foreign Application Priority Data

Dec. 13, 1985 [DE] Fed. Rep. of Germany ....... 3544089

[51] Int. Cl.⁴ ........................ F16D 3/14; C23C 22/08; B05D 7/22
[52] U.S. Cl. ................................. 192/106.1; 403/359; 464/68; 427/239
[58] Field of Search .......................... 192/106.1, 106.2; 403/359; 148/6.15 R; 427/239; 464/68

[56] References Cited

U.S. PATENT DOCUMENTS

| | | | |
|---|---|---|---|
| 2,687,627 | 8/1954 | Binder | 192/106.2 |
| 3,741,747 | 6/1973 | Hamilton et al. | 148/6.15 R |
| 3,795,548 | 3/1974 | Hansen et al. | 148/6.15 R |
| 4,044,873 | 8/1977 | Parsons et al. | 403/359 |
| 4,560,054 | 12/1985 | Kayanoki et al. | 464/68 |
| 4,650,053 | 3/1987 | Kayanoki et al. | 192/106.1 |

FOREIGN PATENT DOCUMENTS

| | | | |
|---|---|---|---|
| 1096443 | 6/1955 | France | |
| 68179 | 4/1986 | Japan | 427/239 |

Primary Examiner—Rodney H. Bonck
Assistant Examiner—David A. Testardi
Attorney, Agent, or Firm—Peter K. Kontler

[57] ABSTRACT

A clutch plate wherein a flange surrounds a sleeve to form therewith a hub serving to support a carrier of friction linings, wherein the carrier can turn relative to the flange through a given angle determined by one or more rivets extendings into cutouts of the flange and connecting two washer-like elements of the carrier, and wherein the flange has windows for coil springs which further extend into registering windows of the washer-like elements. The splined internal surface of the sleeve and the surfaces surrounding the cutouts and windows of the flange are coated with nickel which is thereupon hardened. The remaining portions of the surfaces of the sleeve and flange are phosphatized.

15 Claims, 1 Drawing Sheet

U.S. Patent
Jun. 6, 1989
4,836,350
Fig.1
Fig.2
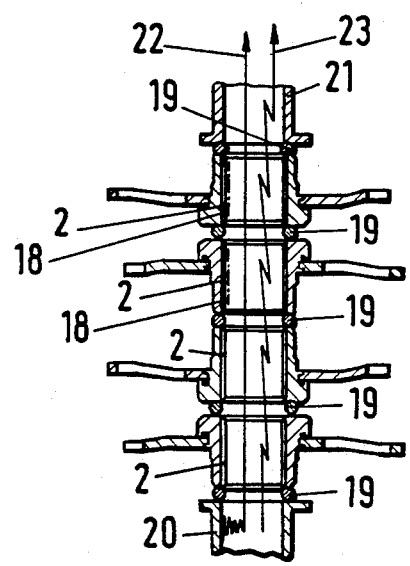
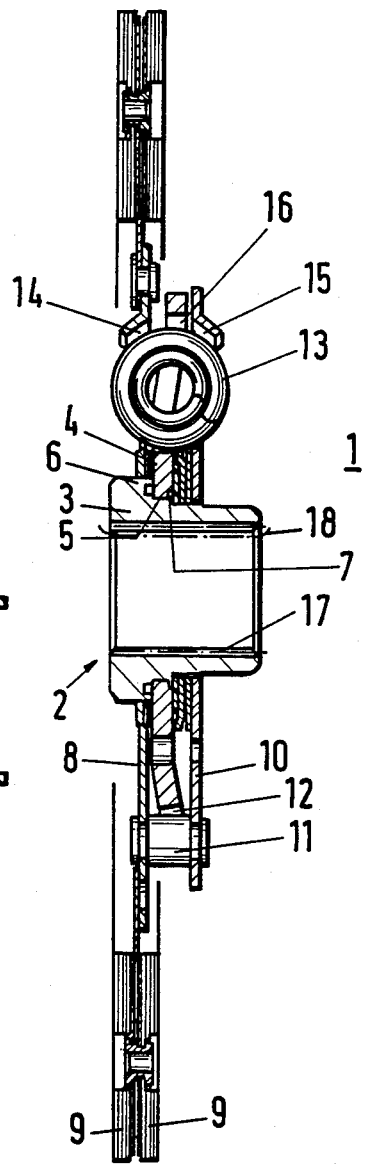

1

DISC-SHAPED BODY FOR USE IN CLUTCH PLATES

BACKGROUND OF THE INVENTION

The invention relates to improvements in disc-shaped bodies which can be used with advantage as components of clutch plates, e.g., in friction clutches of motor vehicles. More particularly, the invention relates to improvements in disc-shaped bodies which can be used for transmission of torque between rotary driven and driving parts, e.g., between a flywheel and/or a pressure plate on the one hand and the input shaft of a change-speed transmission on the other hand.

A clutch plate normally comprises a hub having (a) an internally splined sleeve which can be slipped onto the input shaft of a change-speed transmission and (b) a flange which surrounds and can (but need not) be an integral part of the sleeve. The clutch plate further comprises a carrier of friction linings and frequently a set of energy storing elements in the form of coil springs which are interposed between the flange and the carrier and resist rotation of the carrier relative to the flange and/or vice versa. The friction linings are disposed between the flywheel and the pressure plate of a friction clutch to rotate the hub (and hence the input shaft of the transmission) when the engine is on to drive the flywheel and the cutch is engaged (i.e., when the pressure plate urges the friction linings against the flywheel). Similar clutch plates can be used in other parts of power trains in motor vehicles, e.g., in a bypass (lock-up) clutch which is used in conjunction with a torque converter.

In order to avoid rapid or excessive wear as well as to reduce the likelihood of frictional corrosion of teeth or splines which transmit torque between the sleeve of the hub and a shaft, it was already proposed to provide the entire hub of the clutch plate with a coat of nickel. As a rule, the procedure involves a so-called currentless application of nickel. Certain presently preferred techniques include the BLASBERG (trademark) process, the DURNICOAT (trademark) process and the KANIGEN (trademark) process. As a rule, the thickness of the applied coat of nickel is in the range of 30µ.

OBJECTS AND SUMMARY OF THE INVENTION

An object of the invention is to provide a disc-shaped object which can be used as component part of a clutch plate and is constructed and treated in such a way that it can resist extensive wear and is less prone to frictionally induced corrosion than heretofore known objects.

Another object of the invention is to provide a disc-shaped object which can be protected against excessive wear and/or corrosion in a relatively simple and inexpensive way and without the need for the application of a coat of nickel or the like to the entire surface of the hub.

A further object of the invention is to provide a novel and improved hub for use in the above outlined object.

An additional object of the invention is to provide an object which can be installed in existing friction clutches and like devices as a superior and longer-lasting substitute for heretofore known objects.

Still another object of the invention is to provide a simple and inexpensive method of protecting the above outlined object from excessive wear and/or corrosion.

A further object of the invention is to provide a method which renders it possible to treat a large number of objects in a simultaneous operation.

Another object of the invention is to provide a novel and improved method of applying coats of nickel to the surfaces of hubs which are used in clutch plates and like devices.

An additional object of the invention is to provide a novel and improved method of shielding the internal torque transmitting elements of a hub from excessive wear and/or corrosion and of shielding certain portions of the flange of such hub from excessive wear and/or corrosion.

A further object of the invention is to provide a novel and improved friction clutch which embodies the above outlined object.

One feature of the invention resides in the provision of a disc-shaped body which can constitute or form part of a clutch plate for use in friction clutches of motor vehicles. The diss-shaped body (hereinafter called clutch plate for short) comprises a hub including a sleeve having internal torque transmitting means and a flange surrounding the sleeve, and at least one coat of nickel which is applied to a portion of the hub (i.e., to a portion at least of the sleeve, to a portion at least of the flange or to a portion at least of the sleeve and flange).

The clutch plate further comprises a carrier of friction linings which surrounds the sleeve. The torque transmitting means can comprise internal splines which are provided in the sleeve and serve to transmit torque to an externally speed member, e.g., to the input shaft of a change-speed transmission in a motor vehicle. The aforementioned portion of the hub can include the torque transmitting means.

The carrier can comprise two substantially washer-like elements which flank the flange and can turn relative thereto, and means (e.g., one or more rivets) for coupling the washer-like elements to each other. The flange has at least one window (e.g., a cutout) for the coupling means, and such window or windows are defined by the aforementioned portion of the hub. One or more coil springs or analogous energy storing devices can be installed between the washer-like elements and the flange and, to this end, the flange can be provided with one or more windows for portion(s) of the energy storing device(s). Each such window is preferably formed in the aforementioned portion of the hub.

The thickness of each coat can be between 5–20µ, preferably between 8–15µ.

The coat is preferably hardened (particularly by heat treatment) subsequent to application to the aforementioned portion or portions of the hub. The final degree of hardness of the coat or coats is preferably much higher than the hardness immediately after application to the selected portion or portions of the hub. The final hardness of the coat or coats can be between 800–1100 vickers hardness, preferably between 900–1000 vicker hardness. The remaining portion or portions of the hub can be provided with a phosphatized layer.

Another feature of the invention resides in the provision of methods of making and treating a hub for use in a disc-shaped body, such as a clutch plate.

One of the presently preferred methods comprises the steps of providing a metallic sleeve of the hub with internal torque transmitting means (e.g., in the form of axially parallel splines), subsequent to insertion of the sleeve into an annular flange of the hub, and chemically metallizing (particularly by applying a coat of nickel, preferably in accordance with a currentless technique) at least one portion of the hub (i.e., at least one portion of the sleeve and/or at least one portion of the flange).

A modified method of making and treating hubs comprises the steps of providing each of a series of metallic sleeves (each of which has a central opening) with internal torque transmitting means, inserting each sleeve into a discrete annular flange so that the sleeves and the respective flanges form hubs, stacking the sleeves end-to-end and inserting seals between neighboring sleeves of the resulting stack of hubs, and chemically metallizing (particularly applying coats of nickel) to selected portions of the hubs which form the stack. Seals can also be applied to the exposed end faces of the two outermost sleeves of the stack. The applying step can include conveying a metal-containing bath in pulsating fashion through the central openings of the sleeves. Alteratively, the applying step can include conveying the bath through the openings of the sleeves in pilgrim-step fashion.

A further method of forming a hub comprises the steps of applying a coat of nickel or another suitable metal to at least one selected first portion of the hub and phosphatizing at least one second portion of the hub. The phosphatizing step is preferably carried out without prior pickling of the second portion or portions of the hub. The applying step preferably includes at least one of the following steps:

Alkaline degreasing of the first portion or portions of the hub by decocting, rinsing in a stagnant and/or flowing liquid (e.g., water), pickling in an acid (such as HCl or $H_2SO_4$), rinsing in a cold liquid (e.g., water), short-lasting exposure of the first portion or portions of the hub to the action of an acid (such as HCl or $H_2SO_4$), and contacting the first portion or portions with a metal-containing bath of such composition that the coat preferably contains between 2 and 15% of phosphorus.

The novel features which are considered as characteristic of the invention are set forth in particular in the appended claims. The improved object itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an axial sectional view of a clutch plate which embodies the improved object; and FIG. 2 is an axial sectional view of a stack of superimposed hubs which are in the process of being treated in accordance with a method of the invention.

DESCRIPTION OF THE PREFERRED EMBODIMENTS

FIG. 1 shows a clutch plate 1 which comprises or constitutes a disc-shpaed object adapted to be treated in accordance with the invention. The object comprises a composite hub 2 having a sleeve 3 with internal torque transmitting means 17 in the form of axially parallel splines surrounding its central opening, and a flange 4 which surrounds the sleeve 3 and abuts a radially extending shoulder 6 of the latter. The flange 4 is or can be formed with a set of internal teeth which mate with external teeth on a cylindrical portion 5 of the external surface of the sleeve 3. The external teeth of the sleeve 3 can be formed as a result of forcible application of the flange 4 over the surface 5 whereby the thus obtained shavings enter an annular chamber in the shoulder 6. That side of the flange 4 which faces away from the shoulder 6 has an annular groove 7 immediately or closely adjacent the peripheral surface of the sleeve 3 and serving for reception of a ring-shaped projection which is obtained by shifting (caulking) some material of the sleeve axially and radially outwardly so that the displaced material defines a second shoulder cooperating with the shoulder 6 to hold the flange 4 against axial movement on the sleeve. The internal teeth of the flange 4 hold it against rotation on the sleeve 3.

The clutch plate 1 further comprises a composite carrier of friction linings 9. The carrier comprises two disc- or washer-like elements 8 and 10 which flank the flange 4 and are non-rotatably connected to each other by coupling elements in the form of rivets 11. The friction linings 9 are mounted on the element 8. The elements 8 and 10 can turn relative to the flange 4 and sleeve 3 as a unit against the opposition of one or more energy storing elements in the form of coil springs 13 received in registering windows 14, 15 of the elements 8, 10 and in a window 16 of the flange 4.

The rivets 11 extend into windows in the form of cutouts 12 provided in the periphery of the flange 4. The length of such cutouts (as seen in the circumferential direction of the flange 4) determines the extent of angular movability of the elements 8, 10 relative to the flange 4 and vice versa.

That portion (18) of the sleeve 3 which is provided with the splines 17 has a coat of nickel. The coat of nickel is preferably applied in accordance with the aforementioned currentless technique. If desired or necessary, coats of nickel can also be applied to those portions of the flange 4 which define the windows 12 (for the rivets 11) and/or the windows 16 (for the coil springs 13). FIG. 1 merely shows a single window 12 and a single window 16 but the flange 4 can be provided with several preferably equidistant windows 12 as well as with several preferably equidistant windows 16. Moreover, the flange 4 can be formed with a first set of windows for a first group of coil springs and with a second set of windows for a second set of coil springs in a manner well known from the art of making clutch plates. Those portions of the sleeve 3 and flange 4 which are not coated with nickel are or can be phosphatized.

The coil spring or springs 13 constitute optional features of the clutch plate 1. Such coil springs are used in so-called damped clutch plates wherein the carrier of friction linings is mounted with some freedom of angular movement relative to the flange of the hub. The carrier is, or can be, rigidly secured to the flange 4 and/or to the sleeve 3 if the coil springs 13 are omitted, i.e., the flange 4 of such simplified hub need not be provided with windows 12 and/or 16. It then suffices to apply a coat of nickel only to the internal surface of the sleeve 3 so as to coat the torque transmitting means 17. The application of coats of nickel to the surfaces surrounding the windows 12 and 16 is desirable and advantageous because such surfaces are, or are likely to be, subjected to extensive wear.

The thickness of each coat of nickel is normally between 5 and 20μ, preferably between 8 and 15μ. The freshly applied coat of nickel is preferably hardened so that its hardness is increased quite substantially (e.g., from 550 vickers hardness to 1000 HV). The methods of hardening an applied nickel layer are well known in the relevant arts. For example, the coat can be hardened by heat treatment to a degree of hardness considerably exceeding its hardness at the time of application to the selected portion of the hub.

FIG. 2 shows a stack of several superimposed hubs 2 each of which has a sleeve and a flange. Sealing elements 19 are interposed between neighboring end faces of the stacked sleeves, and additional sealing elements 19 are or can be applied to the exposed end faces of the two outermost sleeves. The seal 19 at the lower end of the lowermost sleeve of the stack abuts a tubular inlet 20, and the sealing element 19 at the upper end of the topmost sleeve abuts a tubular outlet 21. At least that bath which contains nickel and is used to coat the splines in the openings of the sleeves of the stacked hubs 2 is preferably admitted and conveyed in pulsating fashion as indicated by the arrow 22. Alternatively, the bath which contains nickel can be conveyed through the column of sleeves in accordance with the so-called pilgrim-step or pilger technique (this is indicated by the arrow 23). It has been found that such treatment results in the application of a uniform coat of nickel in the region 18 of the internal splines 17 in each sleeve 3.

An important advantage of the improved hub is that it can resist extensive wear at locations where extensive wear is most likely to take place, and also that such resistance to wear is achieved at a low cost and by resorting to a relatively simple nickel applying method. Extensive wear (on the flanges) is particularly likely to take place on composite hubs which are used in clutch plates having coil springs and/or other suitable energy storing elements interposed between the carrier of friction linings and the flange. Frictionally induced corrosion is likely to take place in the region of the splines 17; therefore, such portion of the sleeve 3 is coated with nickel in accordance with the method of the present invention.

At a first glance, it would appear that the parts 3 and 4 of the hub 2 could be more effectively protected against excessive wear and/or corrosion by dipping each of these parts into a nickel-containing bath (or by applying thereto coats of nickel by spraying or the like) prior to assembly of the flange 4 with the respective sleeve 3. However, experiments indicate that the profiles of the splines 17 in the sleeve 3 can change (in the order of magnitude of approximately 0.1 mm) in the course of forcible application of the internally toothed flange 4 over the cylindrical portion 5 of the sleeve 3 so as to ensure that the sleeve and the flange rotate as a unit. As a rule, one would attempt to counter such changes in the profiles of splines 17 by appropriate initial dimensioning of the splines 17; however, this is not possible in a hub of the type shown in FIG. 1 because the application of flange 4 over the sleeve 3 merely entails changes in the profile of a portion (within the cylindrical portion 5) of the splines 17 (as considered in the axial direction of the sleeve 3). Therefore, the presently preferred method of the invention includes the steps of forming the splines 17 subsequent to forcible application of splines onto the cylindrical portion 5 and thereafter applying a coat of nickel only to that portion of the sleeve 3 which is provided with the internal splines 17.

The carrying out of the method in such a way that a coat of nickel is applied only to the splines 17 brings about additional advantages, such as a reduction of the overall cost of coating (because a substantial part of the sleeve 3 need not be coated) as well as that the stability and/or other mechanical characteristics of the flange 4 and sleeve 3 are not influenced in regions where the flange is formed with internal teeth and the sleeve is surrounded by such internal teeth and develops complementary external teeth. This will be readily appreciated by bearing in mind that the preparation for application of a coat of nickel normally involves several preliminary steps including cleaning, pickling, and/or others. Pickling often results in increasing brittleness which is caused by hydrogen.

The application of a phosphate coat to those portions of the hub which are not coated with nickel is preferably carried out without any prior pickling or an analogous preliminary treatment. This is desirable on the aforementioned grounds, i.e., the toughness of the material of the hub is not affected because the phosphatizing step is not preceded by the application of hydrogen-containing acids which would be likely to increase the brittleness of contacted portions of the hub. Phosphatizing constitutes but one of available techniques to protect the exposed surface(s) of the respective portion(s) of the hub.

The sequence of steps forming part of the improved method preferably as follows: The making of splines 17 is preceded by the application of the flange 4 to the periphery of the sleeve 3. In the next step, several hubs 2 are stacked in a manner as shown in FIG. 2 and the resulting stack is placed between the tubular inlet 20 and outlet 21, preferably with the interposition of two additional sealing elements 19 as shown in FIG. 2. This is followed by the step of contacting the internal surfaces of the sleeves 3 with a nickel-containing bath (in contrast to the application of nickel in accordance with an electroplating or like technique) which is conveyed in pulsating fashion (arrow 22) or in pilgrim-step fashion (arrow 23) and flows from the inlet 20 toward and into the outlet 21. Other liquids which are used to treat selected portions of the hubs 2 can be conveyed through the sleeves 3 in similar fashion. These other liquids can be used to treat selected surfaces prior to coating with nickel or upon completed application of a coat of nickel. The phosphatizing step follows the application of one or more coats of nickel. As mentioned above, the phosphatizing step need not be carried out simultaneously with or after a step which includes contacting the respective surface or surfaces of the hub with an acid which could increase the brittleness of the respective portions of the hub.

The application of a coat of nickel to one or more selected portions of a sleeve and/or flange can include some or all of the following steps: Degreasing by alkaline decocting, at least one rinsing step in a running or stagnant liquid (such as water), pickling in HCl or $H_2SO_4$ for the purpose of removing oxides and/or other non-metallic substances so that the exposed surface or surfaces are metallic surfaces, rinsing in a flowing liquid medium (such as cold water) in order to ensure that the surface is clean prior to starting the next step, short-lasting treatment in an acid bath which is normally completed within seconds or fractions of seconds as contrasted with a standard pickling operation, renewed rinsing with a flowing liquid (such as cold water) to clean the acid-treated surface or surfaces, contacting the selected surface or surfaces with a nickel-containing bath, and rinsing with a flowing liquid (such as cold water).

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A composite hub for use in a disc-shaped body, such as clutch plate for use in friction clutches of motor vehicles, comprising: a sleeve having internal torque transmitting means; a flange surrounding said sleeve; and a coat of nickel on a portion only of said sleeve, said portion including said internal torque transmitting means.

2. The structure of claim 1, further comprising a carrier of friction linings surrounding said sleeve, said torque transmitting means including splines provided in said sleeve and arranged to transmit torque to an externally speed member, such as the input shaft of a change-speed transmission.

3. The structure of claim 1, wherein said portion of said hub includes said torque transmitting means.

4. The structure of claim 1, further comprising a carrier surrounding said sleeve and including two substantially washer-like elements flanking said flange, and means for coupling said elements to each other, said flange having at least one window for said coupling means and said portion of said hub defining said window.

5. The structure of claim 1, further comprising a carrier surrounding said sleeve and including two substantially washer-like elements flanking said flange, and at least one energy storing device operating between said flange and said carrier, said flange having a window for said energy storing device and said window being defined by said portion of said hub.

6. The structure of claim 1, wherein said coat has a thickness of between 5 and 20$\mu$.

7. The structure of claim 1, wherein said coat has a thickness of between 8 and 15$\mu$.

8. The structure of claim 1, wherein said coat is hardened by heat treatment to a degree of hardness considerably exceeding its hardness at the time of application to said portion of the hub.

9. The structure of claim 1, wherein said coat has a hardness of between 800 and 1100 vickers hardness.

10. The structure of claim 1, wherein said coat has a hardness of between 900 and 1000 vickers hardness.

11. A method of making a hub for use in a disc-shaped body, such as a clutch plate, wherein the hub is a composite hub having a sleeve and a flange which surrounds the sleeve and the sleeve has internal torque transmitting means, comprising the steps of applying a coat of nickel to at least one first portion of the sleeve, said at least one first portion including the internal torque transmitting means; and phosphatizing at least one second portion of the sleeve.

12. The method of claim 11, wherein said applying step comprises at least one of the steps including alkaline degreasing by decocting, rinsing, pickling in an acid selected from the group consisting of HCl and $H_2SO_4$, rinsing in a cold liquid, short-lasting exposure of said portion to the action of an acid, and contacting said first portion with a nickelcontaining bath.

13. The method of claim 11, wherein said phosphatizing step is carried out without preceding pickling of the second portion of the hub.

14. A disc-shaped body, such as a clutch plate for use in friction clutches of motor vehicles, comprising a hub including a sleeve having internal torque transmitting means, and a flange surrounding said sleeve; a coat of nickel on a first portion of said sleeve, said sleeve further having a second portion; and a phosphatized layer on the second portion of said sleeve.

15. A composite hub for use in a disc-shaped body, such as a clutch plate for use in motor vehicles, comprising: a profile region, particularly a splined region, for torque transmitting engagement with a complementary profiled region, such as a splined region of a shaft, a sleeve-like component and a flange-like component which latter is forcibly and non-rotatably applied around said sleeve-like component, one of said components having a first profile and the other of said components having a complementary second profile which is formed as a result of the forcible application of said flange-like component around said sleeve-like component, said hub further comprising a coat of nickel which is applied in accordance with a currentless technique and coats a first portion only of the hub so as to avoid acid treatment of the remaining portion of the hub and penetration of acid between the profiles where the acid could cause a loosening of the connection which is established between said profiles, the acid treatment of the first portion of the hub having preceded the application of the coat of nickel and a second portion of the hub including said profiles, said first portion including said profiled region of said hub.

* * * * *